(12) United States Patent
Jawharkar

(10) Patent No.: US 12,469,017 B2
(45) Date of Patent: Nov. 11, 2025

(54) REQUEST TRACKING SYSTEM AND METHOD

(71) Applicant: Wells Fargo Bank, N.A., San Francisco, CA (US)

(72) Inventor: Harsh Jawharkar, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/773,478

(22) Filed: Jul. 15, 2024

(65) Prior Publication Data

US 2024/0370838 A1    Nov. 7, 2024

Related U.S. Application Data

(63) Continuation of application No. 17/170,617, filed on Feb. 8, 2021, now Pat. No. 12,039,506, which is a continuation of application No. 16/150,860, filed on Oct. 3, 2018, now Pat. No. 10,915,875, which is a continuation of application No. 15/005,445, filed on Jan. 25, 2016, now Pat. No. 10,096,010, which is a
(Continued)

(51) Int. Cl.
| | |
|---|---|
| G06Q 20/00 | (2012.01) |
| G06F 17/00 | (2019.01) |
| G06Q 20/10 | (2012.01) |
| G06Q 20/14 | (2012.01) |
| G06Q 30/02 | (2023.01) |
| G06Q 30/0601 | (2023.01) |
| H04L 9/00 | (2022.01) |
| H04L 67/50 | (2022.01) |

(52) U.S. Cl.
CPC .......... *G06Q 20/102* (2013.01); *G06F 17/00* (2013.01); *G06Q 20/108* (2013.01); *G06Q 20/14* (2013.01); *G06Q 30/02* (2013.01); *G06Q 30/0633* (2013.01); *H04L 9/00* (2013.01); *H04L 67/535* (2022.05)

(58) Field of Classification Search
CPC .......................... G06Q 10/0875; G06Q 20/02
See application file for complete search history.

(56) References Cited

U.S. PATENT DOCUMENTS

| | | |
|---|---|---|
| 5,947,526 A | 9/1999 | Neu |
| 6,199,077 B1 | 3/2001 | Inala et al. |
| | (Continued) | |

*Primary Examiner* — Rokib Masud
(74) *Attorney, Agent, or Firm* — Foley & Lardner LLP

(57) ABSTRACT

A computer-implemented method for granting a user access to an on-line banking area of a website belonging financial institution responsive to receiving the valid user name and password. The method providing the user with account information regarding checking, savings, mortgage, home equity and/or loan accounts held by the user at the financial institution. The method grants the user access to a request tracking area of the website of the financial institution, receive request related data from the user, the request related data including data relating to at least one expense or goal, calculate portions of each expense respectively owed by each of a plurality of participants in the request and track whether a participant has paid. The method includes sending a message to at least one participant, the message requesting payment for the portion owed by the participant and receiving the payment from the participant in various payment forms.

20 Claims, 19 Drawing Sheets

Related U.S. Application Data continuation of application No. 12/545,697, filed on Aug. 21, 2009, now Pat. No. 9,262,754.

(56) References Cited

U.S. PATENT DOCUMENTS

| | | |
|---|---|---|
| 6,278,993 B1 | 8/2001 | Kumar et al. |
| 6,317,783 B1 | 11/2001 | Freishtat et al. |
| 6,405,245 B1 | 6/2002 | Burson et al. |
| 6,412,073 B1 | 6/2002 | Rangan |
| 6,442,590 B1 | 8/2002 | Inala et al. |
| 6,477,565 B1 | 11/2002 | Daswani et al. |
| 6,510,451 B2 | 1/2003 | Wu et al. |
| 6,517,587 B2 | 2/2003 | Satyavolu et al. |
| 6,567,850 B1 | 5/2003 | Freishtat et al. |
| 6,633,910 B1 | 10/2003 | Rajan et al. |
| 6,725,425 B1 | 4/2004 | Rajan et al. |
| 6,738,804 B1 | 5/2004 | Lo |
| 6,842,782 B1 | 1/2005 | Malik et al. |
| 6,859,212 B2 | 2/2005 | Kumar et al. |
| 6,865,680 B1 | 3/2005 | Wu et al. |
| 6,871,220 B1 | 3/2005 | Rajan et al. |
| 6,931,667 B2 | 8/2005 | Kronenbeger |
| 6,998,223 B1 | 2/2006 | Nihei et al. |
| 7,039,656 B1 | 5/2006 | Tsai et al. |
| 7,085,997 B1 | 8/2006 | Wu et al. |
| 7,155,508 B2 | 12/2006 | Sankuratripati et al. |
| 7,200,804 B1 | 4/2007 | Khavari et al. |
| 7,225,464 B2 | 5/2007 | Satyavolu et al. |
| 8,401,936 B2 * | 3/2013 | Penning ............ G06Q 40/02 705/40 |
| 2001/0016034 A1 | 8/2001 | Singh et al. |
| 2001/0023414 A1 | 9/2001 | Kumar et al. |
| 2001/0032182 A1 | 10/2001 | Kumar et al. |
| 2001/0037297 A1 | 11/2001 | McNair |
| 2001/0051907 A1 | 12/2001 | Kumar et al. |
| 2002/0015480 A1 | 2/2002 | Daswani et al. |
| 2002/0019810 A1 | 2/2002 | Kumar et al. |
| 2002/0023108 A1 | 2/2002 | Daswani et al. |
| 2002/0059369 A1 | 5/2002 | Kern et al. |
| 2002/0138573 A1 | 9/2002 | Saguy |
| 2003/0187925 A1 | 10/2003 | Inala et al. |
| 2004/0078423 A1 | 4/2004 | Satyavolu et al. |
| 2004/0148207 A1 | 7/2004 | Smith et al. |
| 2005/0004867 A1 * | 1/2005 | Spector ............ G06Q 20/00 705/38 |
| 2005/0198377 A1 | 9/2005 | Ferguson et al. |
| 2005/0216824 A1 | 9/2005 | Ferguson et al. |
| 2006/0085259 A1 | 4/2006 | Nicholas et al. |
| 2006/0101323 A1 | 5/2006 | Satyavolu |
| 2006/0129834 A1 * | 6/2006 | Ellmore ............ H04L 63/168 713/183 |
| 2006/0136595 A1 | 6/2006 | Satyavolu |
| 2006/0184617 A1 | 8/2006 | Nicholas et al. |
| 2007/0038716 A1 | 2/2007 | Saguy |
| 2007/0043766 A1 | 2/2007 | Nicholas et al. |
| 2007/0204308 A1 | 8/2007 | Nicholas et al. |
| 2007/0230371 A1 | 10/2007 | Tumminaro |
| 2007/0233615 A1 | 10/2007 | Tumminaro |
| 2007/0233736 A1 | 10/2007 | Xiong et al. |
| 2007/0244811 A1 | 10/2007 | Tumminaro |
| 2007/0255620 A1 | 11/2007 | Tumminaro et al. |
| 2007/0255652 A1 | 11/2007 | Tumminaro et al. |
| 2007/0255653 A1 | 11/2007 | Tumminaro et al. |
| 2007/0255662 A1 | 11/2007 | Tumminaro |
| 2008/0010194 A1 | 1/2008 | Thomas |
| 2008/0032741 A1 | 2/2008 | Tumminaro |
| 2008/0065520 A1 | 3/2008 | Hazlehurst et al. |
| 2008/0098325 A1 | 4/2008 | Williams et al. |
| 2008/0104496 A1 | 5/2008 | Williams et al. |
| 2008/0126476 A1 | 5/2008 | Nicholas et al. |
| 2008/0133391 A1 | 6/2008 | Kurian et al. |
| 2008/0133402 A1 | 6/2008 | Kurian et al. |
| 2008/0154739 A1 | 6/2008 | Kalaboukis |
| 2008/0162349 A1 | 7/2008 | Pratt et al. |
| 2008/0162371 A1 | 7/2008 | Rampell et al. |
| 2008/0172304 A1 | 7/2008 | Berkowitz |
| 2008/0182664 A1 | 7/2008 | Kaplan et al. |
| 2008/0195532 A1 | 8/2008 | Harkins et al. |
| 2008/0208714 A1 | 8/2008 | Sundaresan |
| 2008/0214148 A1 | 9/2008 | Ramer et al. |
| 2008/0215623 A1 | 9/2008 | Ramer et al. |
| 2008/0222048 A1 | 9/2008 | Higgins et al. |
| 2008/0228580 A1 | 9/2008 | Korman et al. |
| 2008/0228598 A1 | 9/2008 | Leff et al. |
| 2008/0275816 A1 | 11/2008 | Hazlehurst |
| 2009/0076950 A1 | 3/2009 | Chang et al. |
| 2009/0094147 A1 * | 4/2009 | Fein ............ G06Q 30/00 705/1.1 |

* cited by examiner

Request Details

Request Name: Moms' Big 40th Birthday Bash

Request Date: 03/25/2008

Request Description (optional): We all agreed kids will pay for winery rental+food. Grandpa Chon will pay for Mariachi's

What are your shared expenses? Add a new expense

Expense: Winery Rental  Cost: 555.00

Who paid for this Expense? Select payer
Who else participated? Select other payers

| Participants | Paid Up Front (?) | Share per Person (?) | Remove |
|---|---|---|---|
| Avery Alda | 0.00 | 138.75 | × |
| Liz Montana (Payer) | 222.50 | 138.75 | × |
| Mark Lennon | 0.00 | 138.75 | × |
| Pat Smith (Initiator, Payer) | 333.00 | 138.75 | × |
| Totals (Paid total is greater than cost.) | 555.50 | 555.00 | |

Cancel   Save for Later   View Totals >>

FIG. 5f

Pay IOU
649

You can make this payment by check, cash, debit card, or credit card. To pay by check or cash, please contact the recipient directly.

Credit card users are subject to a cash advance fee (determined by their bank) as well as interest. We recommend that you use a debit card to avoid these fees. Payment may take 5-7 business days before the money is deposited into the receiver's account.

Pay To            Jen Simmons | jsimmons@hotmail.com
Paid By           Mark Lennon | mlennon@hotmail.com
651 Request Date  03/25/2008
653 Request Name  Mom's Big 40th Birthday Bash
655 Payment Amount $125

Billing Information

657 Cardholder's First Name
    Cardholder's Last Name
659 Billing Address (Line 1)
661 Billing Address (Line 2)
    City
    State
    Zip
663 Card Type
    Credit Card Number
    Verification Code    Your credit card verification code (sometimes called the CVV code) is the 3-digit number to the right of your account number on the back of your card.
665 Expires Cancel   Continue >> 667

FIG. 6a

Payment Confirmation                                    Print this Page

Your payment has been approved. Initiator and recipient will receive an email confirming this payment.

Print this page for your records.

Date Paid          7:16 pm, March 28, 2008
Confirmation #     XXXXX-XX
Paid To            Jen Simmons | jsimmons@hotmail.com
Paid By            Mark Lennon | mlennon@hotmail.com
Request Name       Mom's Big 40th Birthday Bash
Request Date       03/25/2008
Payment Amount     $125
Initiator          Pat Smith

Billing Information

Cardholder's Name           Diana Macias
Billing Address (Line 1)    11031 Broadway Terrace
Billing Address (Line 2)    #3
City                        Oakland
State                       CA
Zip                         94611
Card Type                   MasterCard
Credit Card Number          XXXX XX-XX XXXX 1963
Expiration                  03/2010

NOTE: This payment will show up on your credit or debit card statement as "Banking Institution Request Online Service."

FIG. 6b

SettleUp

Track Request Payments

Track Request | View Request

You can update a participant's payment status below for offline payments, send them a reminder "nudge" email, or add a note to yourself.

When a participant makes an online payment, we automatically update the payment status.

Request Name: Mom's Big 40th Birthday Bash
Request Date: 03/25/2008
Request Description: We all agreed kids will pay for winery rental+food. Grandpa Chon will pay for Mariachi's Payment Status:

| Participant | IOU Amount | Fee (?) | Amount Received | Pay To | Status | Date Paid | Actions |
|---|---|---|---|---|---|---|---|
| Avery Alda | $41.73 | | | Liz Montana | Unpaid | | Note to Self \| Nudge |
| Avery Alda | $97.13 | $0.00 | | Pat Smith | Unpaid | | View Note \| Nudge |
| Mark Lennon | $41.72 | $2.50 | $41.72 | Liz Montana | Paid Offline | 3/1/2008 | View Note |
| Mark Lennon | $97.12 | | $94.72 | Pat Smith | Paid Online | 3/1/2008 | Note to Self |

▶ See the Math

Save Changes

REQUEST TRACKING SYSTEM AND METHOD

CROSS-REFERENCE TO RELATED APPLICATIONS

The present application is a continuation of and claims priority to U.S. patent application Ser. No. 17/170,617 filed Feb. 8, 2021 (now U.S. Pat. No. 12,039,506), which is a continuation of and claims priority to U.S. patent application Ser. No. 16/150,860 filed Oct. 3, 2018 (now U.S. Pat. No. 10,915,875), which is a continuation of and claims priority to U.S. patent application Ser. No. 15/005,445 filed Jan. 25, 2016 (now U.S. Pat. No. 10,096,010), which is a continuation of and claims priority to U.S. patent application Ser. No. 12/545,697 filed Aug. 21, 2009 (now U.S. Pat. No. 9,262,754), the contents of all of which are incorporated herein by reference in their entireties.

BACKGROUND OF THE INVENTION

Many people rely on others to help them save money towards a specific goal or purpose. These goals may be self-involved in nature (e.g. savings for personal goals such as an emergency fund, down payment for a house, initial payment for a car, etc.) or charitable in nature (collecting money to be gifted to others in the form of cash or objects, gathering funds to be donated to the March of Dimes, etc.) On many occasions, groups of people attend events where the cost of the event is initially paid by one individual, an initiator, and each participant should pay back the initiator at a later time. On many such occasions, the participants fail to or forget to pay back the initiator, sometimes due to the fact that the initiator does not remember or does not remind the participants who owe the money. On other occasions, the initiator does not keep track of who has paid what amount.

The embodiments of the present invention address at least the above issues related to groups with shared costs or multiple shared costs, as well as various purposes/causes/goals driven by multiple contributors.

SUMMARY OF THE INVENTION

Embodiments of the present invention relate to a computer-implemented method that includes granting a user access to an on-line banking area of a website of a financial institution responsive to receiving the valid user name and password. The method may provide the user with account information regarding one or more checking, savings, home mortgage, home equity and/or student loan accounts held by the user at the financial institution. The method may grant the user access to a request tracking area of the website of the financial institution, receive related data for a request from the user, the related data including data regarding at least one expense, calculate portions of each expense respectively owed by each of a plurality of participants in the group and track whether a participant has paid. The method includes sending a message to at least one of the participants, the message requesting payment for the portion owed by the participant and receiving the payment from the participant in various payment forms, including who owe whom and for what.

BRIEF DESCRIPTION OF THE DRAWINGS

FIG. 5b is a screen display that may be provided to the user that allows the user to add a new request in the screen shot shown in FIG. 5a.

FIG. 5c is a screen display that may be provided to the user that allows the user to choose the participants of the new request from FIG. 5b.

FIG. 5d is a screen display that may be provided to the user that allows the user to enter the e-mail address of a new participant.

FIG. 5f is a screen display that may be provided to the user that shows the participants who paid up front, how much other people still owe, and totals regarding the request that was added in FIGS. 5a-d.

FIG. 6a shows an example screen display that may be shown to a user to enable the user to pay an owed amount.

FIG. 6b shows an example screen that allows the user to review the payment information and verify its accuracy.

FIG. 7 is a screen display that may be provided to the user for tracking request payments.

FIG. 9 is a screen display that may be provided to the user for creating a plurality of profiles with different preferences.

DETAILED DESCRIPTION OF EXAMPLE EMBODIMENTS

Figure 1:
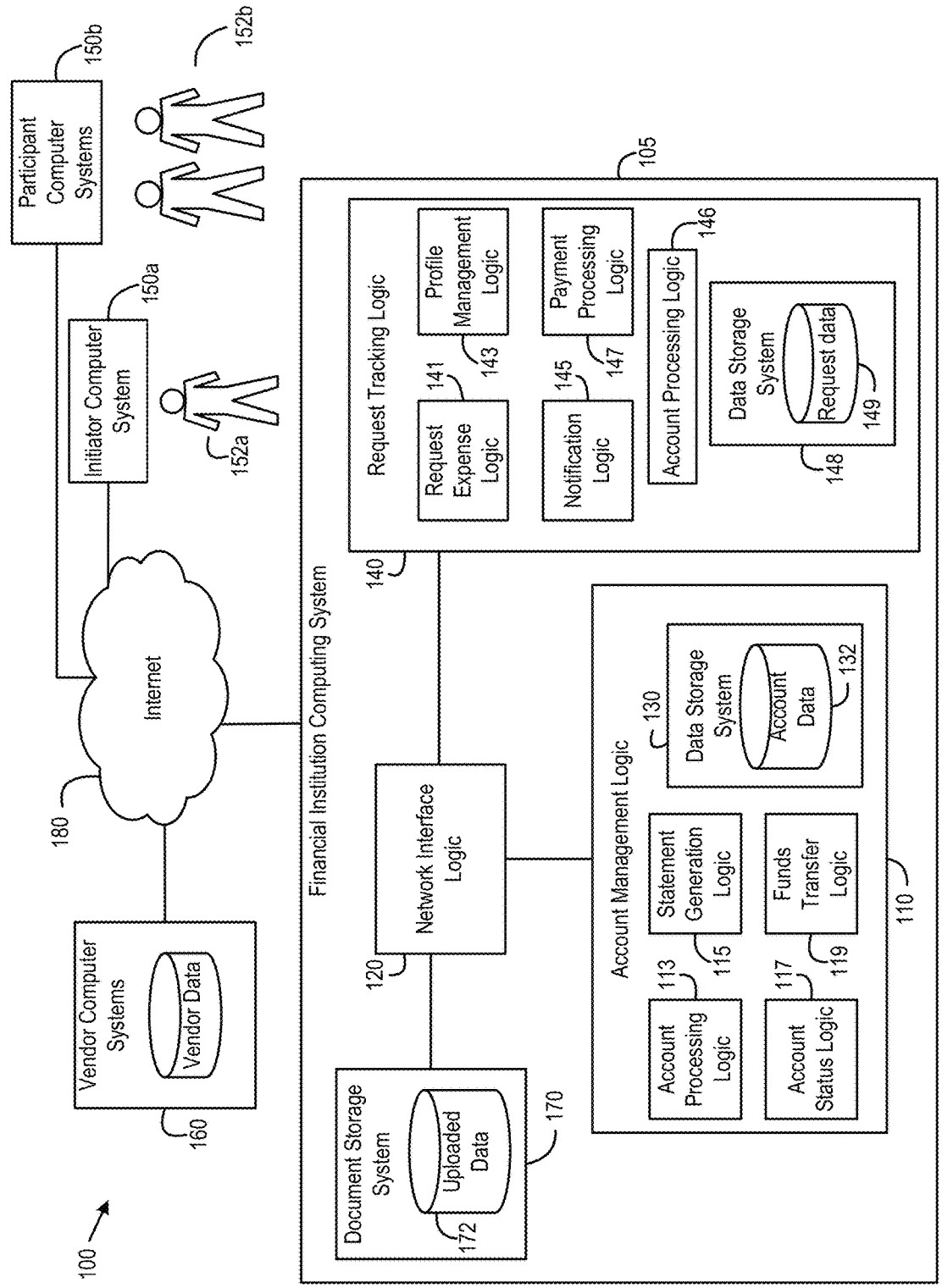
FIG. 1 is a schematic diagram of a data processing system according to an embodiment of the present invention.

Referring to FIG. 1, a system 100 according to an example embodiment of the present invention is shown. The data processing system 100 may include an enterprise computing system 105 that may include, among other systems, account management logic 110, network interface logic 120, data storage system 130, and request tracking logic 140. The enterprise computing system 105 may include server-based computing systems, for example, comprising one or more networked computer servers that are programmed to perform the operations described herein.

In an example embodiment, the enterprise computer system 105 may be provided by a financial institution, such as a bank, and the users may be the customers of the financial institution that access the system 105 through tellers at retail bank branches, through the Internet, or in another manner. The customers may, for example, access system 105 through an on-line banking area of a website provided by the banking institution. In one example embodiment, the user may be granted access to the request tracking area of the website of the financial institution based on the same user name and password that is used to grant the user access to the on-line banking area of the website. As another example, computing system 105 may be associated with other types of companies that maintain customer accounts, such as utility companies, insurance companies, retailers, and so on. As another example, computing system 105 and the request tracking logic 140 may grant access to both the online banking area of a website of a financial institution response to receiving the valid username and password. In alternative embodiments, the valid username and password that applies to the online banking area of the financial institution may also grant the user with access to the expense tracking logic 140. Upon the user entering the expense tracking area of the website, the profile of that user automatically has a pull down box pre populated with the at least a partial bank account number with the account balance being displayed.

In the example where system 105 is provided by a financial institution, account management logic 110 may further include account processing logic 113, statement generation logic 115, account status logic 117, and funds transfer logic 119. Such logic may, in practice, be implemented in a machine (e.g., one or more computers or servers) comprising machine-readable storage media (i.e. cache, memory, flash drive or internal or external hard drive or in a cloud computing environment) having instructions stored therein which are executed by the machine to perform the operations described herein. The account processing logic 113 may perform account processing to process transactions in connection with the account(s) of the account holder, such as account debits and credits to checking and savings accounts, credits and debits to home mortgage and home equity accounts, credits and debits to student loan accounts, stored value accounts, gift card accounts and so on. For example, in the context of checking accounts, the transactions may also include electronic bill payment transactions in which monies from the checking account of the user are used to receive funds that are owned to the user. The account processing logic 113 may retrieve and store information in the data storage system 130 relating to the account data 132. Statement generation logic 115 may generate statements for a customer user relating to the customer's account(s). Account status logic 117 may generate codes that indicate account status, such as, current, delinquent, late, over the limit, in default, funds are being held for processing or the like. The funds transfer logic 119 may be used to transfer funds between accounts of a single account holder or between an account of an account holder and a third party (which may or may not be another account holder). The fund transfer logic 119 may receive a fund transfer request from a customer through a teller, through the on-line banking area of the website, or through other systems in the banking institution computer system 105, such as the request tracking logic 140. In response to a fund transfer request, the fund transfer logic 119 may transfer funds from an account related to the request tracking logic 140 account. The fund transfer logic 119 may perform the transfer of funds and update the account data 132 related to the account management logic 110.

Network interface logic 120 may be used to connect the computing system 105 to the Internet to permit customers to access computing system 105 through an on-line banking area or other websites provided by the bank. For example, in the context of desktop/laptop computers, network interface logic 120 may comprise one or more computers or web servers that provide a graphical user interface (e.g., a series of dynamically-generated web pages) for users that access the subsystems of system 105 through the web. The graphical user interface may be used to prompt the user to provide login information, passwords and other authentication information or other stored tokens, to provide the user with account information, and so on. Network interface logic 120 may also comprise other logic that is configured to provide an interface for other types of devices such mobile devices that includes cell phones, smart phones, fax machines, ATMs, and server-based computing systems.

The data storage system 130 stores account data 132. In particular, such data may include data regarding account balances and funds that are transferred in and out of the banking institution accounts by, for example, request tracking logic 140 and the account processing logic 146. In another example embodiment, the request tracking logic 140 can generate a transaction history within an online banking session where the transactions generated by the request tracking logic 140 are identified as such in the banking institution account. In another embodiment, while in an online banking session recent transactions that were conducted by the request tracking logic 140 may also be displayed and identified with appropriate request name and/or expense name.

Request tracking logic 140 may be used by a request initiator 152a through the internet 180 or a connection that may comprise one or more telephone utility connections, cellular network connections, VOIP connections, and so on. The request tracking logic 140 allows an initiator 152a to track expenses, divide expenses, calculate who owes whom and send payment requests to various participant, as discussed in greater detail below in FIGS. 2-9. The participants 152b may send payments or communicate with the initiator 152a using a participant computer system 150b. In other embodiments of the present invention, an initiator can be a participant or a payer. In other embodiments, a participant may be able edit the request related information by simply requesting the original initiator for approval. In other embodiments, multiple individuals can be designated as a request editors. Also, a given user can be both an initiator and participant over the course of different requests.

The request tracking logic 140 may receive initial request related data from a request initiator 152a. The data includes request information, for example, a description of the request, a date of the request, various expenses with monetary values, tangible goods, other participants, and so on. As another example, the request tracking logic 140 may have access to a data storage system 148 that may be updated dynamically by one or more of the systems of the request tracking logic 140. The data storage system 148 may store information such as the amount of money each participant has paid, how much money is owned to the initiator, the date of last set of payment requests sent to the participants, and so on. Examples of requests may include any type of group event with expenses shared between more than one individual (e.g., birthdays, weddings, parties, trips, restaurants, and so on.) as well as various goals (savings, etc.) or causes (charitable, etc.) The request tracking logic 140 may track various costs and collection of shared costs from a plurality of participants 152b. For example, the request tracking logic 140 may send payment requests to the participants 152b. In such an instance, the participant computer system 150b alerts the participants 152b that they have received a payment request and payment should be made to the initiator 152a. The request-related information that is received by the request tracking logic 140 regarding the participant may include, among other information, participant name and request name, e-mail, address, zip code, phone number and so on. The request tracking logic 140 may allocate portions of the expense to a participant 152b or the request tracking logic 140 may remind the participants 152b.

The request tracking logic 140 may include a request expense logic 141, a profile management logic 143, notification logic 145, account processing logic 146, payment processing logic 147, and data storage system 148. The request expense logic 141 may calculate each participant's share and track the expenses for requests. The profile management logic 143 maintains profiles for users. Users may also be permitted to create multiple profiles, as discussed in greater detail in FIG. 9. Profile management logic 143 may, for example, have access to the data storage system 148 for storing a plurality of profiles for each user to allow a user to separate the requests for each profile.

The notification logic 145 prepares a payment request and sends the request for payment to a participant. To this end, the notification logic 145 may remind the initiator to send out reminder payment requests or may automatically (e.g., on a weekly, monthly or yearly basis) send a reminder payment request to the participants who owe funds or other objects. For example, the reminders of the notification logic 145 may be programmed based on settings in the profile associated with a given request. The total number of reminders sent may also be limited to a predetermined number (e.g., such that no more than two reminder are sent).

The account processing logic 146 may transfer funds, stored value or credit into a settlement account or transfer monetary value, stored value or credit as the initiator wishes. In an example embodiment, the computer system can be configured to store its data in the data storage system 148. The data can include totals of the monetary values for each request or the like.

The payment processing logic 147 may accept payments from a participant allowing for various payment options (i.e. credit card, debit card, gift card, stored value card, paypal, bank account or their own settlement account). As previously indicated, on many occasions, especially when people are paying by credit card, it can be challenging to calculate or split the bill on the spot, the initiator or someone ends up paying for the event. The person then has to try to collect the funds from all the other participants, which can be embarrassing and time consuming. The payment processing logic 147 allows the participants to enter various types of payment methods and allows the account of the initiator to accept the payment.

In an example embodiment, the request tracking logic 140 receives request related information from the initiator 152a via the initiator computer system 150a. The request tracking logic 140 is configured to calculate each participant's share of the total cost of the event/goal/cause. Moreover, the request tracking logic 140 may track which participants 152b have paid and which participants 152b continue to owe money to the initiator 152a. The request tracking logic 140 may send (e.g., via e-mail, text message, etc.) a payment request with appropriate links and information to enable the participants 152b to pay the initiator 152a the amount owed or previously agreed upon.

In an example embodiment, the enterprise computing system 105 includes a document storage system 170 disclosed in U.S. application Ser. No. 12/290,299 filed Oct. 29, 2008, entitled "Document Storage System or Method", the entirety of which is incorporated herein by reference. The document storage system 170 and the uploaded data 172 can include receipts for requests that are uploaded by an initiator 152a or via a vendor computer system 160. The document storage system 170 may also be configured to collect and manage information such as contact information, account numbers (e.g., credit card account numbers), online account information (e.g., login names and passwords for online/ website accounts), other wallet contents, and so on.

The vendor computer systems 160 may allow a request initiator 152a to log into its systems 160 and extract request costs to the request tracking logic 140 and to store receipts in document storage system 170. The vendor computer system 160 can also be electronic invitation systems such as e-vite or open table and so on. These systems are able to track who is attending an event or who will not be able to attend. Moreover, the vendor computer system 160 can track the number of guests a participant is bringing to vary their costs in the request tracking logic 140.

Figure 2A:
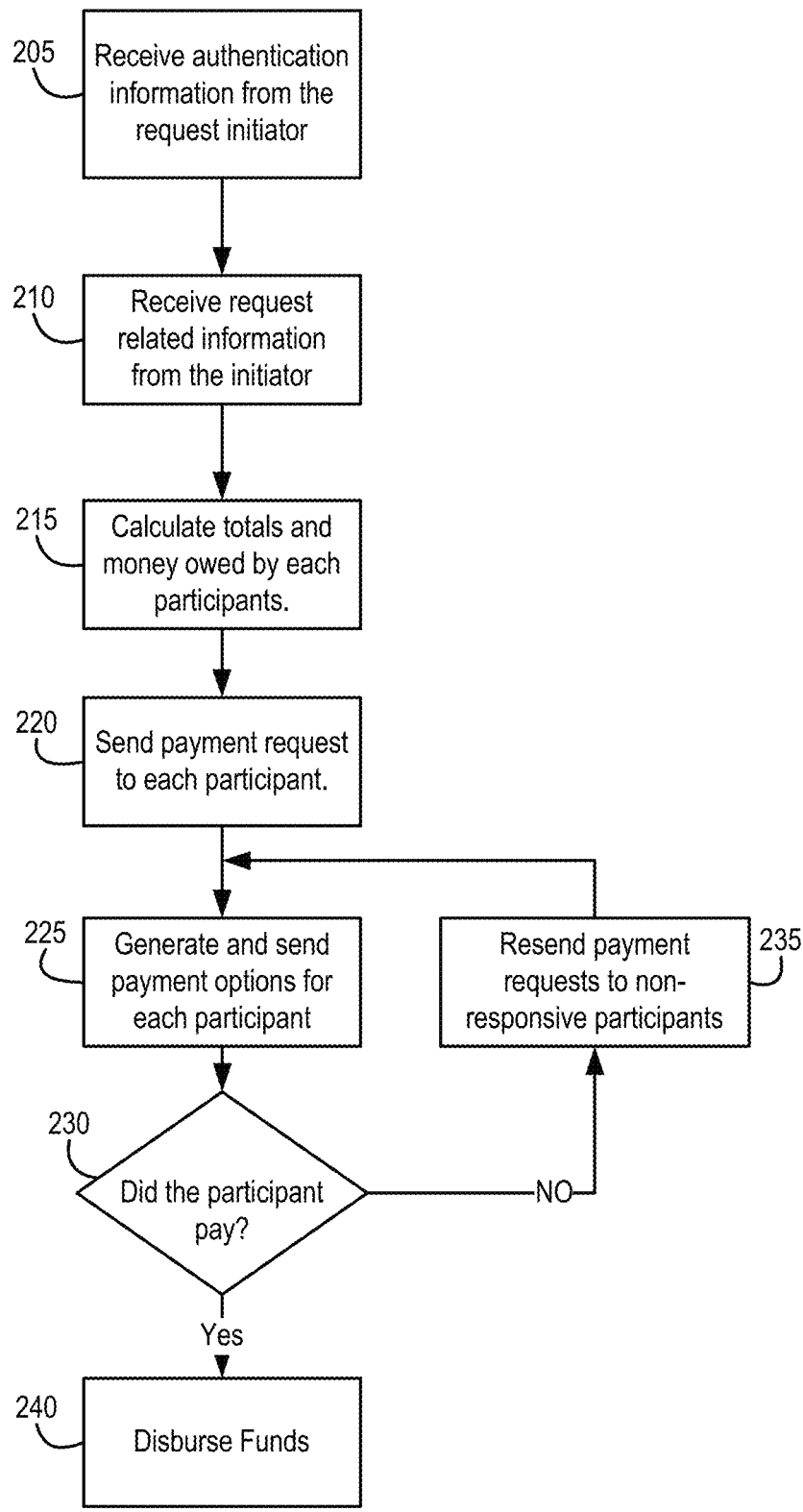
FIG. 2a is an example process that may be implemented using the system shown in FIG. 1.
Figure 5A:
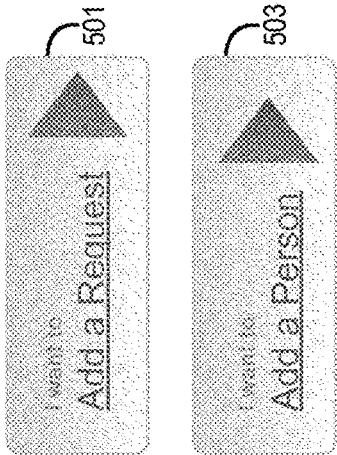
FIG. 5a is a screen display that may be provided to the user after receiving user login information or if the user chooses the My Requests tab.

Referring to FIG. 2a, FIG. 2a is an example process that may be implemented using the system shown in FIG. 1, by an initiator to collect funds from participants. At step 205, the request tracking logic 140 receives the request initiator authentication information. The request tracking logic 140 may display a screen as shown in FIG. 5a (discussed in greater detail below) which allows the initiator to add a new request or a new contact person to the data storage system 148. At step 210, the request expense logic 141 may receive request related information from the initiator 152b. Such request details may include request name, request date, request description, expense name, cost of the expense, and the participants. Next, at step 215, the request tracking logic 140 calculates the totals and the money owed by each participant. An example of the total and the money owed calculation is shown at least in FIGS. 5e, 5f, 5g, 6a and 6b, discussed in greater detail below. Next, at step 220, the notification logic 145 may generate or retrieve the payment requests for the funds or items that are owed the initiator. Next, at step 225, the notification logic 145 may access the account management logic 110 to determine whether the participant has bank accounts, credit accounts, stored value accounts or so on within the system 105. If it is determined that the system 105 has accounts for one or more of the participants, then notification logic 145 can generate payment options for each such participant that the system 105 has accounts using the account information.

The request tracking logic 140 may be configured to receive data from vendor computer system to determine the availability of funds for each participant. For example, the notification system can check with third party data providers (i.e., other banks, Transunion, Equifax, Experian or so on) for the account balances and/or availability of funds to pay the initiator. Based on that determination, the notification logic 145 may generate customized payment options at step 225 for each participant and send the notification to the participant. At step 230 the payment processing logic 147 determines whether a participant has paid. If a participant has not paid, then at step 235 the notification logic 145 resends the payment request to the participant who has not paid. Once the participant has paid, then the payment processing logic 147 disburses the funds to the initiator 152a.

Figure 2B:
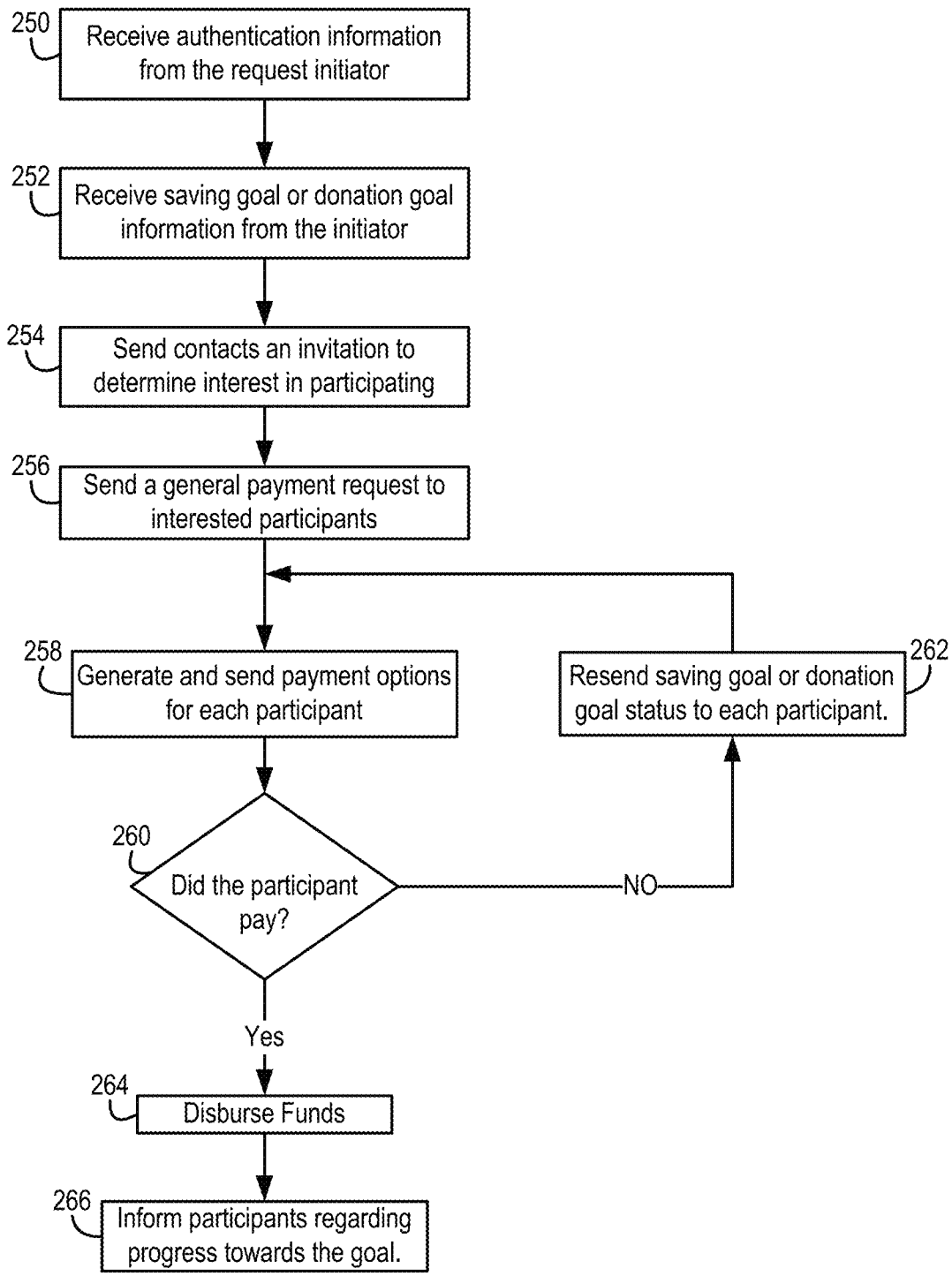
FIG. 2b is another example process that may be implemented using the system shown in FIG. 1.

Referring to FIG. 2b, FIG. 2b is an example process that may be implemented using the system 105 shown in FIG. 1 by an initiator to collect funds from participants for purposes such as attaining a savings goal and receiving gifts for occasions. As described in greater detail below, in other embodiments, the process and systems shown in FIGS. 1-10 may be used by charitable organizations to collect funds from participants or collect recurring funds from individuals. At step 250, the request tracking logic 140 receives authentication information from the request initiator. The request tracking logic 140 may display a screen as shown in FIG. 5a (discussed in greater detail below) which allows the initiator to add a new request or a new contact person to the data storage system 148. At step 252, the request expense logic 141 may receive saving goal or donation goal information from the initiator 152b. Such request details may include request name, request date, request description, expense name, cost of the expense, and the participants. The saving goal may be the initiator asking the participants to contribute funds or items for occasions or goals where the expense has not been incurred by the initiator. For example, the saving goal may be funds for a honeymoon, down payment on a house or a car, gift for an upcoming birthday, matching a child's savings, and so on. Such request details may include request name, request date, request description, expense name, cost of the expense, and the participants.

As another example embodiment, an organization, group, team or club may use the systems and methods described herein to ask for donations, collect funds for a cause, raise funds for classroom, collect dues, and so on. In such a situation the organization may request that a payment is made to achieve a target amount. The organization may offer various levels of contribution levels (i.e. platinum, gold, silver or bronze). System 105 and the methods described herein, allow a participant to configure recurring payments and provide the participant with a transaction history for each payment for their records.

Next, at step 252, the request tracking logic 140 receives a saving or a donation request from the initiator. Next, at step 254 the system 150 may be configured to allow the initiator to send all selected contacts an invitation to determine whether a participant is interested in contributing to the saving goal or donate to the organization. The participant may indicate by selecting a button or replying by an e-mail that the participant is interested or not interested. Next, at step 256, the system 105 may generate a list of interested participants and send each interested participant a general payment request. As discussed with regard to FIG. 2a, at step 258, various payment options may be generated for each participant such as the notification logic 145 may access the account management logic 110 to determine whether the participant has bank accounts, credit accounts, stored value cards or so on within the system 105. If it is determined that the system 105 maintains account information for one or more of the participants, then notification logic 145 may generate payment options for each such participant for whom the system 105 maintains accounts using the account information. The payment options may include displaying which accounts have the required amount of funds. In other embodiments, the payment options may also include allowing a participant to choose partial percentages or partially pay a request.

The request tracking logic 140 may be configured to receive data from vendor computer system to determine the availability of funds for each participant. For example, the notification system can check with third party data providers (i.e., other banks, Transunion, Equifax, Experian or so on) for the account balances and/or availability of funds to pay the initiator. Based on that determination, the notification logic 145 may generate customized payment options at step 258 for each participant and send the notification to the participant. At step 260 the payment processing logic 147 determines whether a participant has paid. If a participant has not paid, then at step 262, the notification logic 145 resends the saving goal or donation goal reminder to each non-responsive participants. If the participant has paid, then the payment processing logic 147 disburses the funds to the initiator 152a. Lastly, at step 266 the system 105 may inform each participant regarding the progress towards the saving goal or the contribution. Each communication between the system 150 and the participants may occur via at least one of the internet, e-mail, text message, or so on.

Figure 3A:
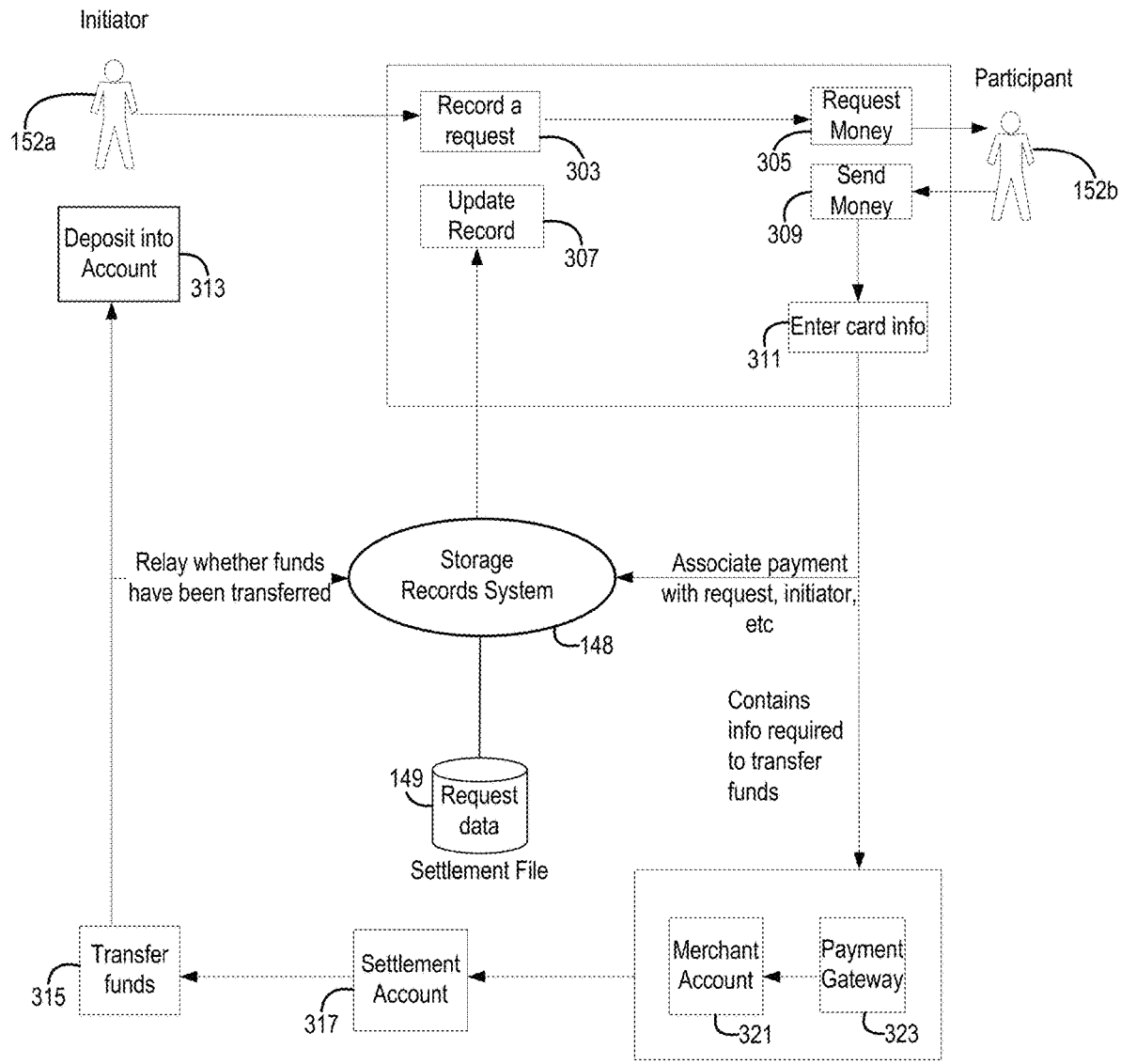
FIG. 3a is another example process that may be implemented using the system shown in FIG. 1.

Referring now to FIG. 3, FIG. 3 shows an example of the flow of the request from the initiator 152a and the cash flow from the paying participant 152b to the initiator 152a in greater detail. In particular, the initiator 152a records a request at step 303 in the request tracking logic 140. After recording the request, at step 305, a money request is sent to the participant 152b. The participant 152b may respond by clicking on a link in the message and sending the money in step 309. If the participant 152b does not have an account with the request tracking logic 140, then the participant 152b may send the funds at step 309 by inputting credit card numbers or account numbers. If the participant 152b decides to use a card, at step 311, the participant 152b may enter the card information. Next, at step 301, the payment processing logic 147 associates the payment from the participant with the appropriate request and the initiator or receiver. In one embodiment, the association of the payment can occur based on each request having a unique identifier. Once the payment and the request are associated to each other, the data storage system 148 and the request data 149 is updated to reflect that the payment is ready for processing. The card information or the payment information is transmitted to the payment processing logic 147 that has a payment gateway 323 that can be an e-commerce application service provider service that authorizes payments for credit cards. The payment gateway 323 generates information for the merchant account 321 which can have a contract under which an acquiring bank extends a line of credit to a merchant, who wishes to accept payment card transactions of a particular card association brand. Next, the payment processing logic 147 transfers the funds from the merchant account 321 to a settlement account 317. At step 315, the funds are transferred to the initiator's account 313 and the data storage system 148 is updated by relaying that the funds were transferred.

Figure 3B:
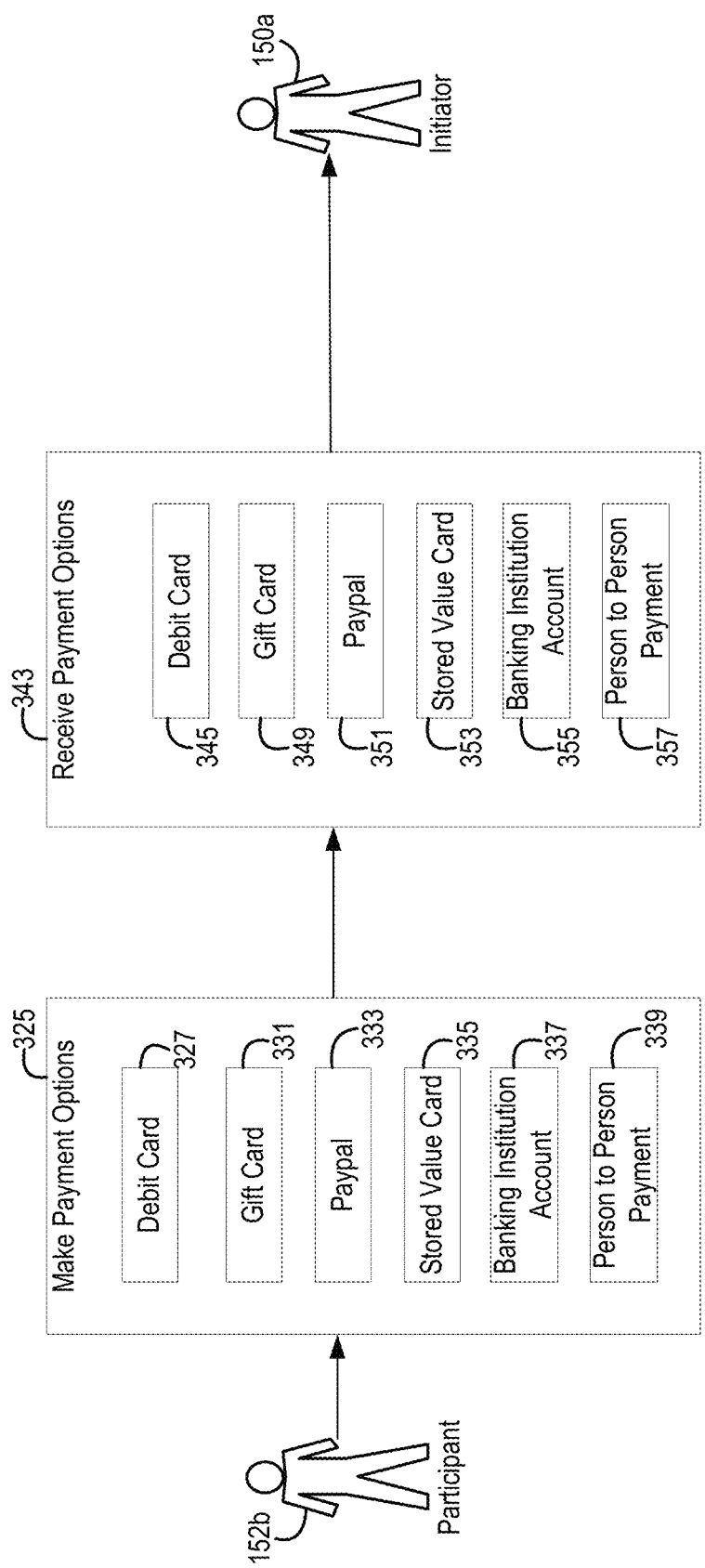
FIG. 3b is another example process that may be implemented using the request tracking logic shown in FIG. 1.

Referring to FIG. 3b, FIG. 3b is a diagram showing payment options 325 available to the participant 152b for transferring funds between the participant 152b and the initiator recipient 152a. The payment options 325 available to the participant 152b may include, but are not limited to, a debit card 327, gift card 331, pay pal account 333, stored value card 335, banking institution accounts 337 (e.g., checking, savings, money market held at the financial institution), and person-to-person payment method 339 (e.g., intercustomer transfer, mobile device payment, or western union). The payment options discussed above may be implemented through a banking institution website. For example, while a user is logged into a banking institution website, a link or browser extension may be provided to create an account in the request tracking logic 140. The profile management logic 143 can associate the banking account, credit card account, debit card held at the financial institution with the new request tracking account. With regard to a stored value, the card may be made and mailed to the recipient of the funds. If the user is using a banking account that belongs to a banking institution that is not associated with the request tracking logic 140 service, then the user may enter the account information while setting up their profile.

A similar set of options 343-357 exists for the initiator to receive payment. The payment processing logic 147 is configured to accept payment information and to deliver the funds to the initiator 152a. If the payment processing logic 147 is able to convert the funds to cash, then the funds can be transferred to a bank account belonging to the initiator 152a.

Figure 4:
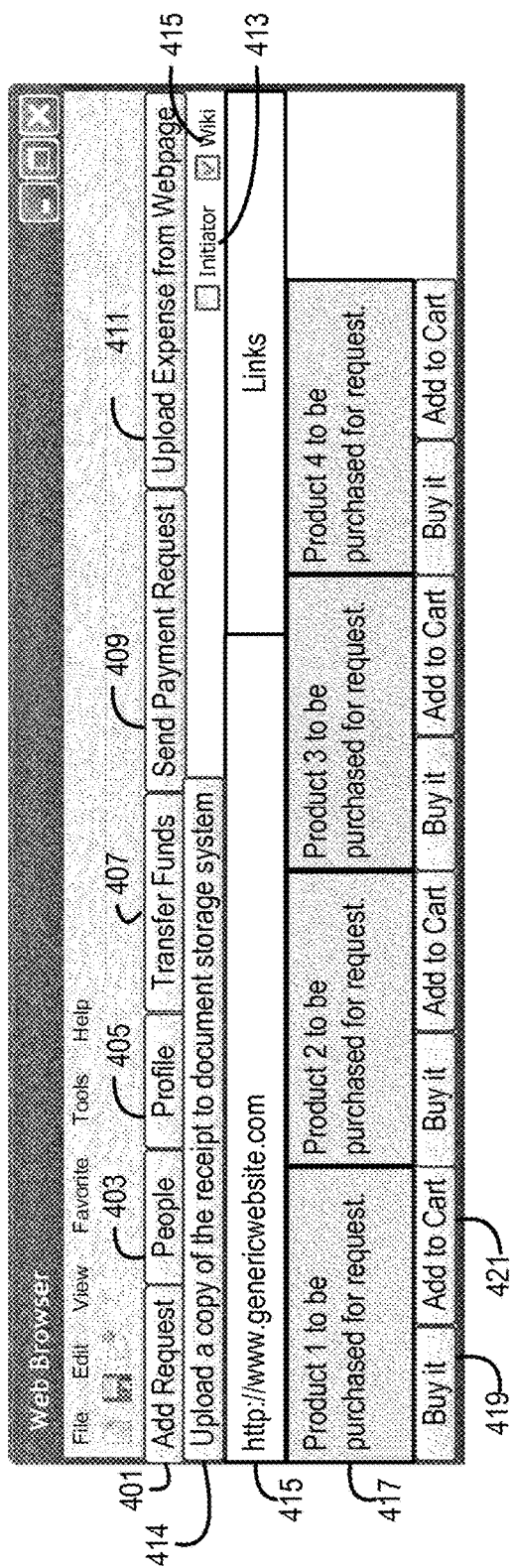
FIG. 4 is an example embodiment of a browser extension that may be implemented using the system shown in FIG. 1 to capture costs from a website using a browser.

Referring to FIG. 4, access to the request tracking logic 140 may be provided via a browser extension application. A browser extensions can provide the user with request expense tracking tools while using a web browser, even though the user is not explicitly logged into the request expense tracking application. The browser extension can be configured to use web scraping to extract data from a web site and populate data fields requested by the request tracking logic (discussed below in connection with FIGS. 5a-9). In an example embodiment, the web browser extension may be a single button placed in the browser that captures data from the current website and loads the data into a website provided by the system 105. For example, item description information and cost of an item can be extracted if the website is an on-line retailer, request information if the website is an event planning site, account information if the website is a credit card provider, and so on. For example, event planning sites allow an individual to reserve tables a restaurants or meeting locations at hotels or create groups that can make reservations. The buttons that are described below provide specific examples.

FIG. 4 is a screen display of an example embodiment of a browser extension tool bar that allows access to the request tracking logic 140. The browser extension tool bar allows an initiator to add requests or expenses by selecting a dollar amount from any web-page, including but not limited to banks or credit card issuers' websites, as well as online retailers. In an example embodiment, the browser extension may be configured to launch the web application that allows access to the request tracking logic 140. In other embodiments, the browser extension embodiment may enable integration with event invitation and management services such as Meetup, Evite, Opentable, and so on. In another embodiment, the request tracking logic can access calendar dates from Outlook, Lotus Notes and other e-mail and calendar programs and devices.

As shown in FIG. 4, an add request button 401 enables a user to add a new request that is related to an expense or product shown on a webpage. The people button 403 allows a user to add contact information for individual when a user is using a web based e-mail, such as but not limited to, gmail, yahoo mail, hotmail, fastmail or the like.

The transfer funds button 407 enables the user to transfer funds from request tracking logic 140 account to a bank account or to transfer funds to an initiator, if funds are owed. The send payment request button 409 enables the user to forward payment requests to various participants. An upload expenses button 411 allows the request tracking logic 140 to upload costs related to the products on a webpage. The upload a copy of the receipt button 414 allows the user to upload a receipt of something that the user just purchased on the website. Button 414 may be used by a user, for example, when a purchase website displays the "thank you for you purchase" page or at the end of a the purchase transaction.

The Wiki check box 415 allows a user to choose the mode of a new request. That is, the user may indicate whether the user wants to allow the participants editing rights to the requests expenses and costs. The participants in the Wiki mode can edit, change, update data that other users have entered. While in the Wiki mode, any user associated with the request is allowed to modify data, and each modification creates an audit trail that can be displayed by settle up. Each user must approve the data entered to finalize the changes and send a payment request. This allows each participant to buy an item or incur an expense and enter the expense in a single request expense tracking account. To facilitate this functionality, a revision history log may also be maintained to keep track of the changes.

The editor check box 413 allows the user the choice of being the editor (and a participant) or only a participant. In the editor mode, one person is responsible for creating an request, entering the data and expense management. Only the editor can modify data and adjust the payment requests being sent. The editor mode also enables the initiator to set two sub-modes, namely, banker or facilitator. In the banker mode, the initiator can allow him or herself to receive money, whereas in a facilitator mode the user allows any request/expense participant to receive funds.

Another embodiment may include, button 419 to buy a product. The user may click on the buy it button 419 to purchase the product 1 labeled 417 to order allow the request tracking logic 140 to be the form of payment to the website. The expense may be added to a request so that the cost of the expense can be split with other participants.

The web browser extension can also allow the program to be available even if the computer system of the user is not connected to the internet. That is, the web browser extension can receive input from the user when the internet is not connected to the user and later after being connected to the internet, synchronize the data between the system 105 and the computer being used by the user. The system 105 allows developers create web applications that can run offline. In the offline mode the local computer being used the user can provide provides features like a local server, to cache and serve application resources (HTML, JavaScript, images, etc.) without needing to contact a server, a database, to store and access data from within the browser, worker thread pool, to make web applications more responsive by performing expensive operations in the background.

Referring to FIG. 5a, FIG. 5a is an example welcome screen for a request tracking service implemented by request tracking logic 140. The user may be presented with the welcome screen of FIG. 5 after the user has entered their authentication information. The welcome screen may allow a user to either add a request using button 501 or add a contact or a person using the button 503. In an alternative embodiment, if the user has active requests, then the welcome screen may display all the active requests and their status. The screen provides the user with directions on how the settlement service operates and provides the user with a phone number to call to receive additional assistance.

Figure 5B:
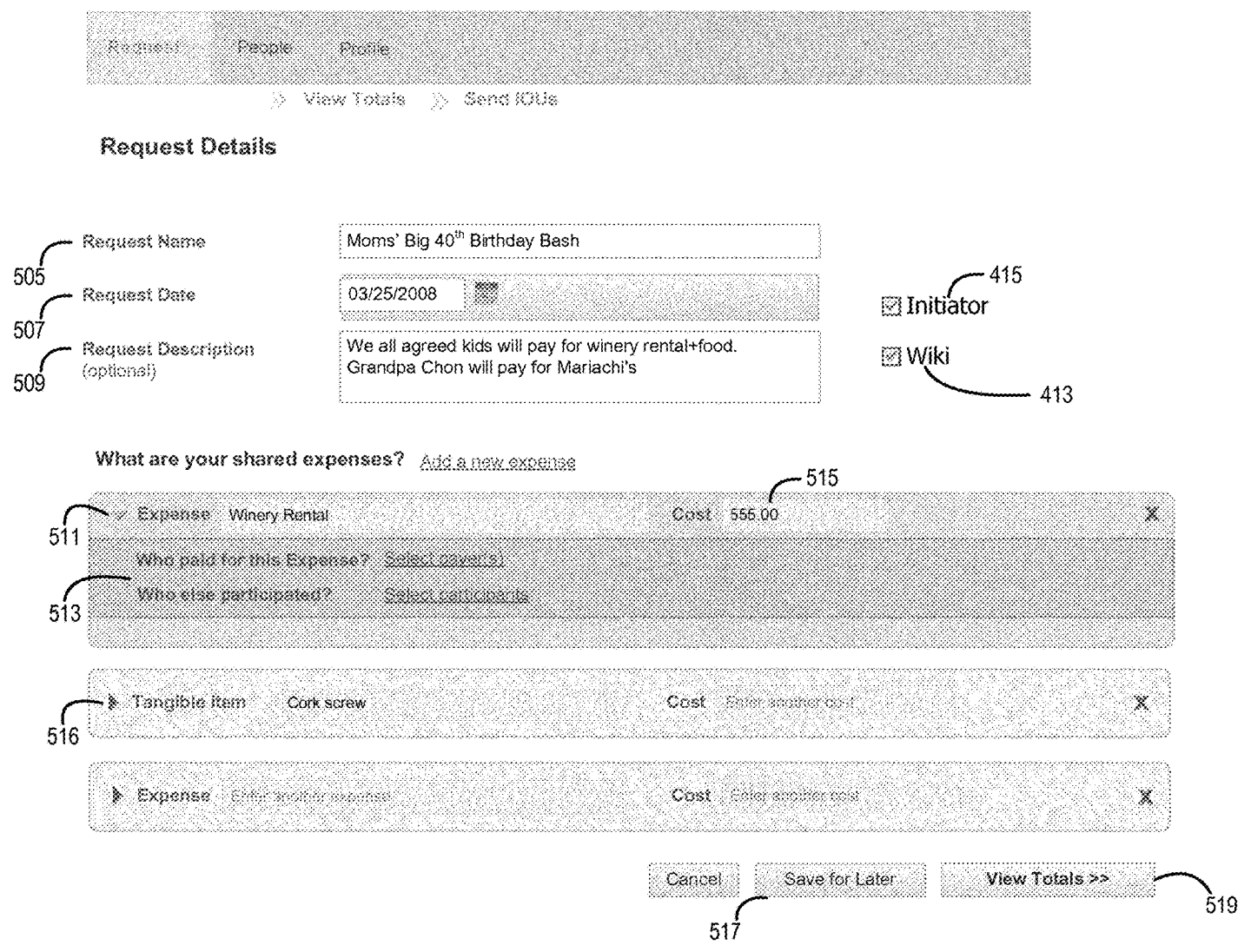

Referring to FIG. 5b, FIG. 5b is an example screen display that can be shown to the user if the user chooses to add a request. For example, in the example shown on FIG. 5b, the user wants to plan "Mom's Big $40^{th}$ Birthday Bash" event. The request planning logic 140 requests the request name 505, the request date or date range 507, and an optional request description 509. The screen display allows the user to add multiple expenses. As an example, the expense of Winery rental in field 511 is shown with a cost of $555.00. Next, with each expense, the request tracking logic 140 allows the user to track the possible payers and the participants separately. Next, the request tracking application offers a non-monetary format which allows users to pledge, collect and pool items or services (e.g. food, objects, expertise, etc.) together instead of cash/currency. When non-monetary objects are used the initiator and participant continue to have the same complete functionality as if cash were involved. For example, a tangible item 516 is shown such as party tent for the wine tasting. Shown at the bottom is a save for later button 517, which allows a particular expense to be saved for the user to return to in the future. The data storage system 148 may store the request data 149 for later. Clicking on another button, the view totals button 519 saves the request automatically and allows the user to see the total number of payers and who has paid how much. Editor check box 413 allows the user to set up the new request as an editor or as a participant. Also shown is check box 415 for the Wiki mode, where the initiator can set up the request as a Wiki page that is editable by other participants. When using the Wiki mode, in one embodiment, each participant may be asked to sign up for an account with the request planning logic 140. However, in other embodiments, a link may be sent allowing the participants access via the link, without the participants having to sign up for an account.

Figure 5C:
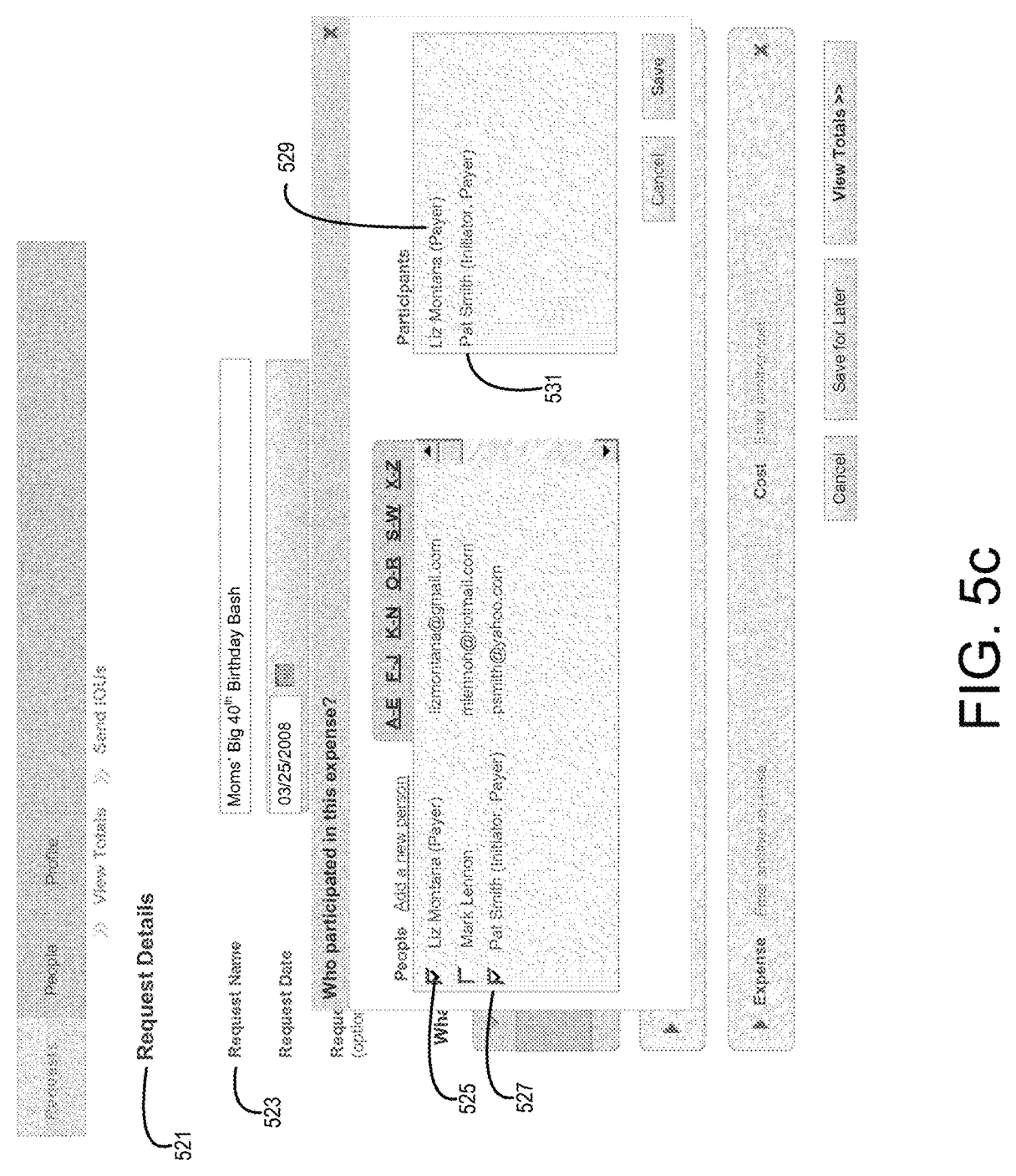

Referring to FIG. 5c, FIG. 5c is a screen display that is shown when the user selects the select participant button 513 in FIG. 5a. A pop up screen shows the list of people associated with this user account with check boxes next to each. Upon clicking on the check boxes, that person's name is displayed in the participant area 529. In one embodiment, the initiator and the payer are automatically selected. After making the selections, the user can click the save button and the pop up screen is minimized.

Figure 5D:
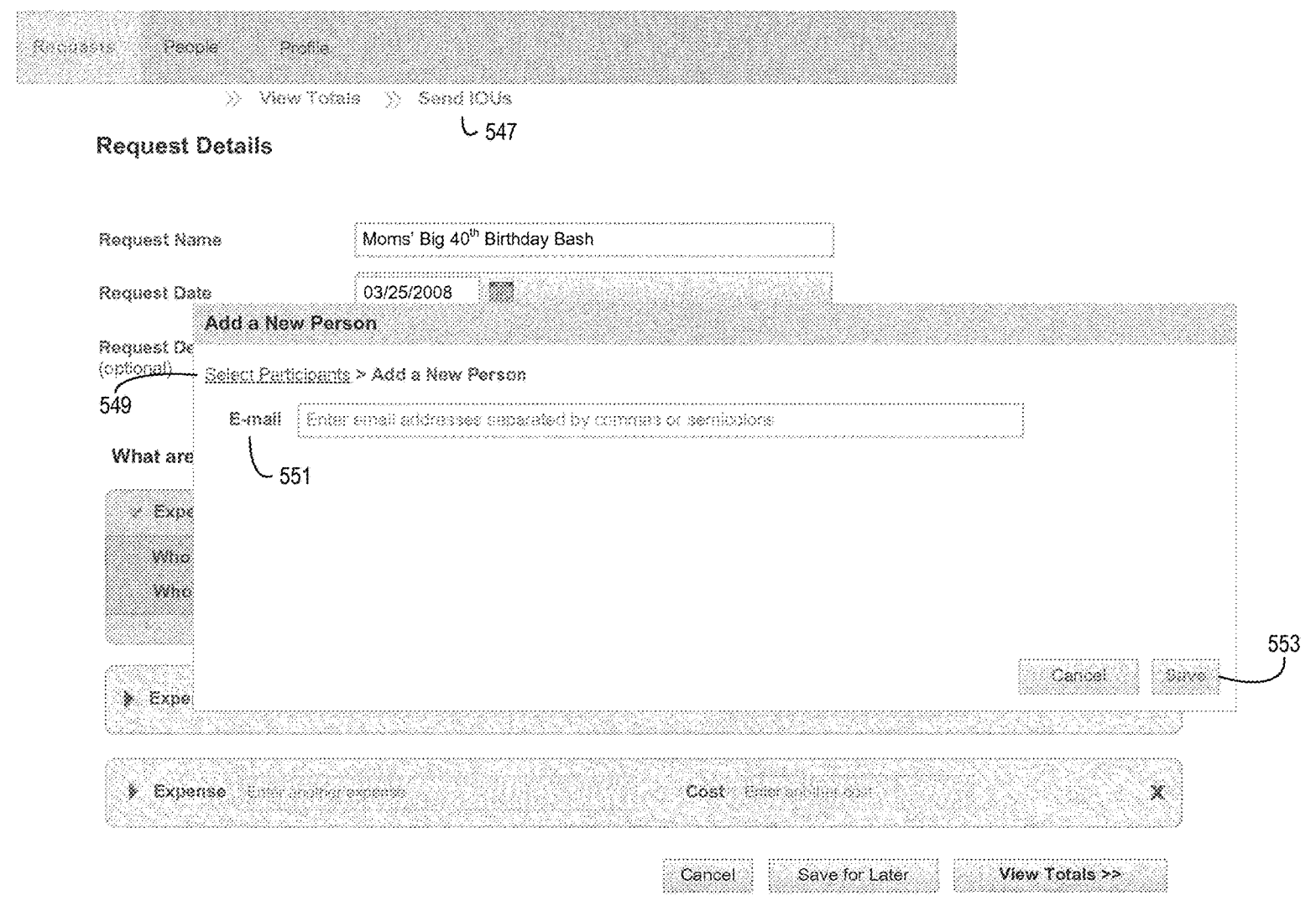

FIG. 5d is a screen display that may be provided to the user that allows the user to enter the e-mail address of a new participant. In FIG. 5c, if the user clicks on add a new contact link, FIG. 5d is displayed. Here, the user can type in the e-mail address of the new person to be added. However, in other embodiments, other personal identification means can also be used such as, name, address, phone number or account number.

Figure 5E:
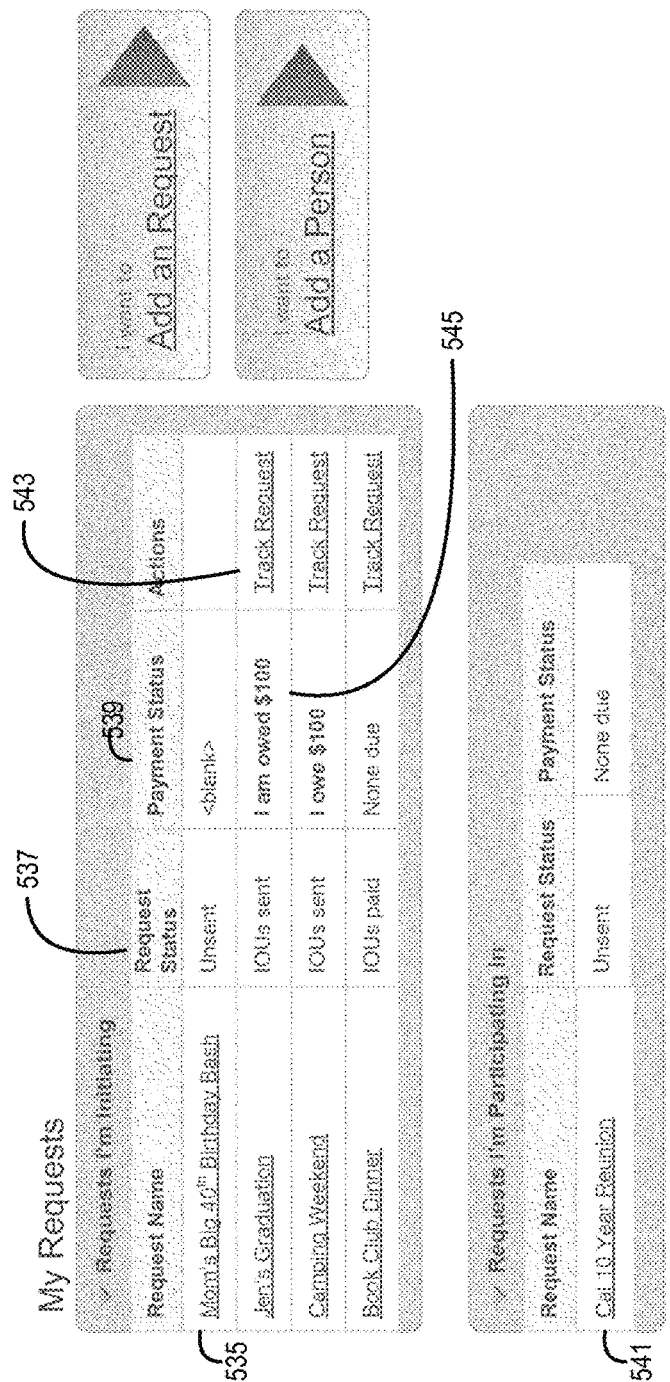
FIG. 5e is a screen display that may be provided to the user that shows each request the user is organizing and each request in which the user is participating.

FIG. 5e is a screen display that may be provided to the user that shows each request the user is organizing and other requests in which the user is participating. The display shown in FIG. 5e is shown to the user as an alternative to FIG. 5a, i.e., in situations where the user is not using the service for the first time. In the illustrated example, the user is organizing "Mom's Big 40th Birthday Bash", "Jen's Graduation", "Camping Weekend" and "Book Club Dinner." The request status 537 is also provided for each request. For example, as shown in FIG. 5e, this user has sent payment requests or IOUs (I owe you) to the participants. Also displayed is the payment status, such as whether funds are owed and by whom. A track request link 543 is provided in the actions column 543. In an example embodiment, the track request link 543 appears if the payment requests have already been sent. In other embodiments, the track request link 543 appears for each request regardless of the payment requests.

FIG. 5f is a screen display that may be provided to the user that shows the participants who paid up front, how much each person owes, and the totals regarding the request that was added in FIGS. 5a-c. FIG. 5f allows the initiator to input data into the paid up front column 577 and calculates the total amount of payments that were received prior to entering the request information. The request expense logic 141 is able to calculate the share per person (shown in field 575) by dividing the total paid by the number of paying participants and the share per person is then displayed in column format.

Figure 5G:
FIG. 5g is a screen display that may be provided to the user that shows the amount by which each user overpaid or underpaid.

FIG. 5g is a screen display that may be provided to the user that shows each participant's overpayments and underpayments. If the user clicks on the "see the math" link 584, the system displays the status column that shows the overpaid and underpaid column. The request tracking logic 140 can calculate the over/under paid column based on the share per person. Next, the initiator 152a can send a payment request using button 595 ("Send IOUs"). The IOUs can be sent in the form of an e-mail, text message (SMS) or a voice mail informing the participants that they owe money to the initiator for the request. The message can identify the initiator 152a, the request name and description. The payment request message can include a link to the request web-page to show the payer the math used to calculate their portion. The payment request message can also include a link that allows the payment processing logic 147 to receive payment information from the payee.

Referring to FIG. 6a, FIG. 6a shows an example screen that may be shown to the payer to enable the payer to pay the owed amount. The payment request message informs the payer that the payment will be paid to the person identified in field 651. The request date 653 and the request name 655 is provided. Also shown is the payment amount that the payer is responsible for paying. The example form shown in FIG. 6a allows the payer to enter credit card related information.

After the payer clicks the continue button 667, the payment confirmation is shown in FIG. 6b. FIG. 6b allows the payer to review the payment information and verify its accuracy and then click on a pay now button to process the payment. The payment information is sent to the payment processing logic 147 to process the payment and data storage system 148 is updated accordingly.

Referring to FIG. 7, FIG. 7 shows an example screen for tracking request payments. In FIG. 7, the IOU amount 729 for each participant is listed, also the fee 731 that each participant has incurred is displayed. An amount received column 733 shows how much each participant has paid. The pay to column 735 shows whom the participant needs to pay. The status column 737 shows which participants have paid in full, others who have not paid, and others who paid cash directly or paid offline. The date paid column 739 shows the date on which each participants paid. The initiator 152a is able to take a variety of actions, shown in column 740. One of the actions that can be taken is write a note regarding a participant or give a participant a reminder to pay (a "nudge"). The nudge command can be grayed out as shown on 743, when it is not available (e.g., after the participant has been nudged twice). The nudge link can be removed for paid items.

Figure 8:
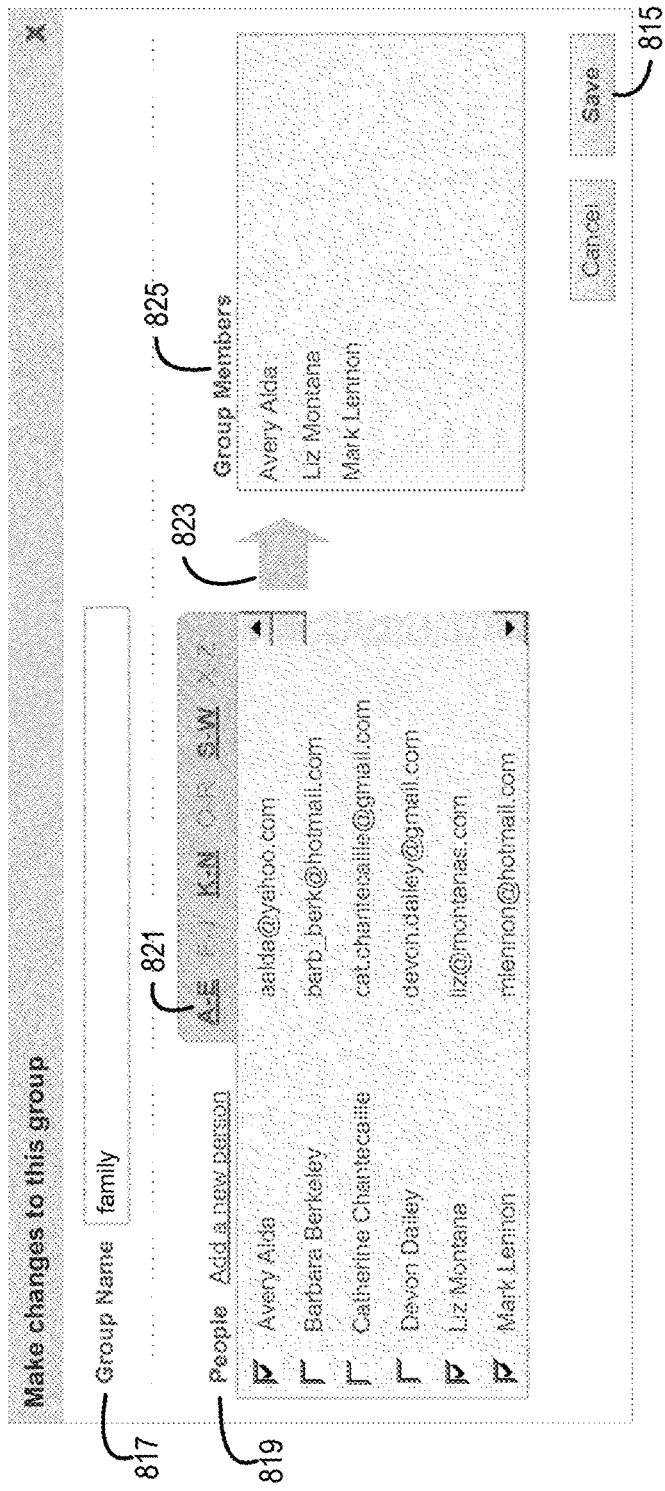
FIG. 8 is a screen display that may be provided to the user for creating and/or editing groups of individuals.

Referring to FIG. 8, FIG. 8 shows another screen where a user can create groups of contacts, for example, if a user commonly has requests with the same group of people. FIG. 8 shows a user creating a family group. A group can be created using two windows, a parent window 819 and a group window 825. All the contacts are listed in the parent window. By clicking on the checkbox next to a name and clicking the right arrow 823, the contact name is copied into the group window. Next, by clicking the save button 815, the group will be available for use later. A user group can create a shared stored value account in the expense tracking application, the account can be used to make and receive payments associated with group activities and requests. The initiator (acting as a banker or facilitator) can control the usage of the shared value account. The participants listed on this account can receive from and/or send money to the shared account. In another embodiment, the users can also disburse funds to other users by sending a stored value card or a gift card via mail or e-mail.

Figure 9:
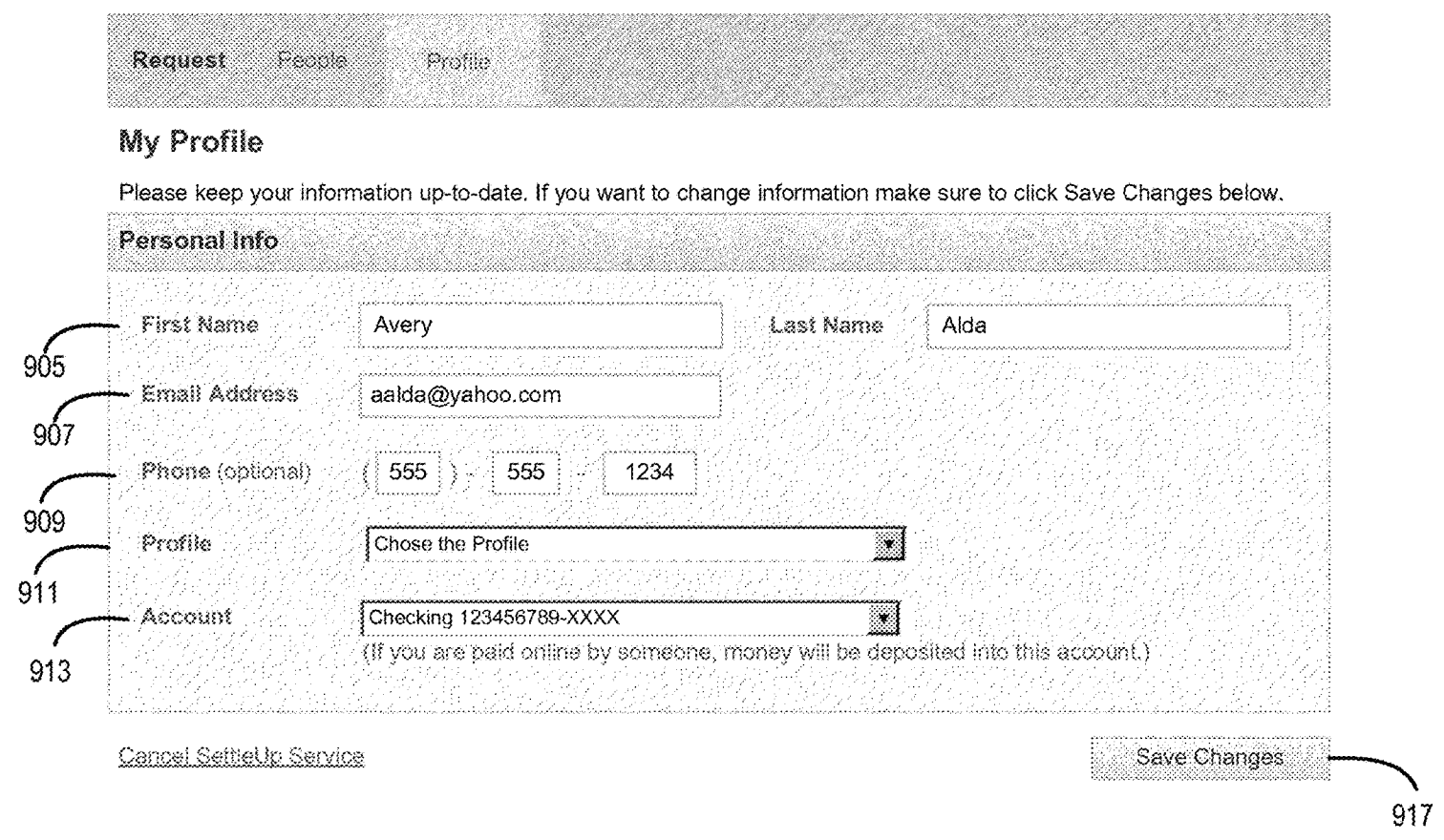

Referring to FIG. 9, FIG. 9 is a screen display that shows the use of profiles to a single user. A single user can have multiple profiles in the same account. For example, if the user is the head of an organization, then the contact information and account number for the user as the head the organization may be different than their personal contact information. The user can also configure their profiles such that different bank accounts are used in connection with different profiles. As another example, the user's work contact information for work contracts may be different than family contact information. The multiple profiles may, for example, allow a user to fully segregate personal requests and expenses from personal/club/group expenses. The user may have a different set of preferences for each profile.

By clicking on the profile tab the user can display the my profile page. The user's first and last name can be stored in fields 905. The e-mail address can also be stored in field 907. The user's phone number 807 can be stored in field 909. A profile pull down menu 911 allows a user to choose which profile stored the above discussed contact information. Different account 913 are associated with each profile. However, in other embodiments the account number can be shared between two or more profiles.

Figure 10:
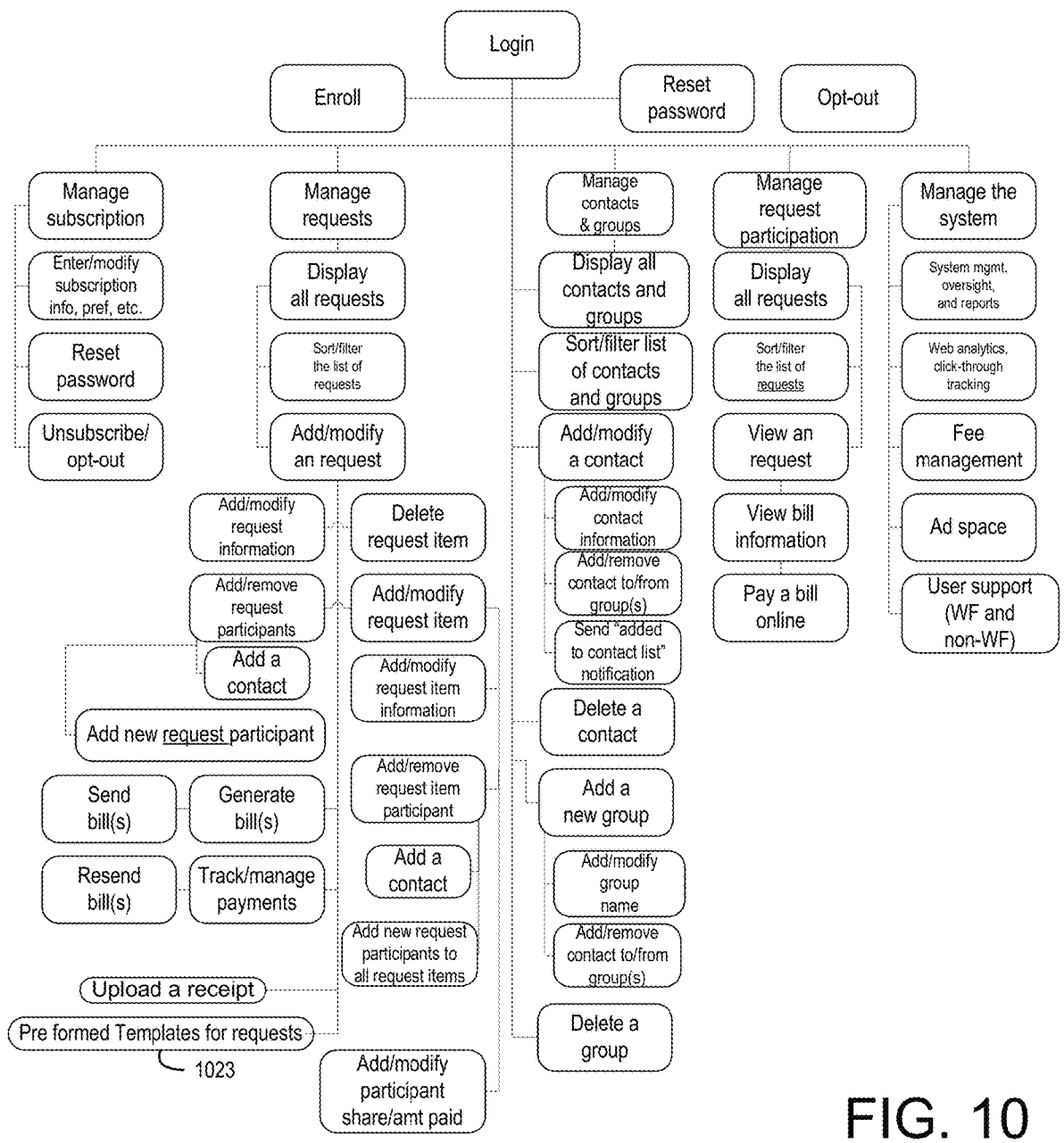
FIG. 10 is a hierarchical diagram showing components that may be implemented in the request tracking logic shown in FIG. 1.

Referring to FIG. 10, FIG. 10 shows various other functions that can be implemented by the request tracking logic 140. For example the user can manage their subscription (component 1009), manage requests (component 1011), manage contacts and groups (component 1013), manage request participation (component 1015), and manage the system (component 1017). Each of the above components has multiple sub components, some of which are discussed above.

As will be appreciated, other features may also be provided. For example, using component 1023, pre-formatted templates of expense for common requests may be preprogrammed into the management of the requests. For example, birthdays, anniversaries tend to have cakes and thus there may be a cake expense built into the birthday template. Another common request may be lunch or dinner with friends or colleagues where drinks are usually purchased and thus there may be a template that includes a drinks button. In other embodiments, the system may allow a user to form a customized template. Other templates may be provided for request such as, vacations, family reunion, birthday, bridal shower, baby shower, room-mate situation, charity collection, fantasy sports leagues, children's sports leagues, PTA requests and so on. An option may also be provided for users to share templates amongst themselves.

In other embodiments, one or more of account management logic 110, network interface logic 120, request tracking logic 140, and a data storage system 130 may be part of a different enterprise computing system (e.g., for a different enterprise) or may be located in a different location than other ones of the logic 110-140. Each of the various components and subcomponents of the enterprise computing system 105 is shown as being implemented as a single integrated computer system using appropriate software. However, in other embodiments, combinations of dedicated or specialized computing systems may also be used.

The embodiments of the present invention have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing computers in the form of computers, including a processing unit, a system memory or database, and a system bus that couples various system components including the system memory to the processing unit. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. User interfaces, as described herein may include a computer with monitor, keyboard, a keypad, a mouse, joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention.

Throughout the specification, numerous advantages of the exemplary embodiments have been identified. It will be understood of course that it is possible to employ the teachings herein without necessarily achieving the same advantages. Additionally, although many features have been described in the context of a particular data processing unit, it will be appreciated that such features could also be implemented in the context of other hardware configurations.

While the exemplary embodiments illustrated in the figures and described above are presently preferred, it should be understood that these embodiments are offered by way of example only. Other embodiments may include, for example, structures with different data mapping or different data. The invention is not limited to a particular embodiment, but extends to various modifications, combinations, and permutations that nevertheless fall within the scope and spirit of the appended claims.

What is claimed is:

1. A mobile device, comprising:
one or more processors coupled to memory, the memory storing processor-executable instructions that, when executed by the one or more processors, cause the one or more processors to:
receive, via a first input to a graphical user interface presented on a display of the mobile device, request data identifying (i) an expense and (ii) one or more participants;
determine, based on the first input or a second input provided to the graphical user interface, a respective share of the expense for each of the one or more participants;
transmit, to an expense tracking system, the request data and the respective share of the expense for each of the one or more participants, causing the expense tracking system to:
(i) generate a payment option for a participant of the one or more participants based on an account of the participant and based on the respective share of the expense that the participant owes;
(ii) send a message to each of the one or more participants, the message including a request for payment of the respective share of the expense owed by a respective participant of the one or more participants; and
(iii) track whether the respective share corresponding to each of the one or more participants has been paid;
receive data from the expense tracking system indicative of a payment event; and
dynamically update, based on the payment event identified in the data from the expense tracking system, the graphical user interface to include one or more indications of whether the respective share corresponding to each of the one or more participants has been paid.

2. The mobile device of claim 1, wherein the processor-executable instructions, when executed by the one or more processors, further cause the one or more processors to:
present, on the display of the mobile device, as part of the graphical user interface, at least one field that accepts participant information for the one or more participants, the participant information comprising at least one of a participant name, a participant e-mail address, a participant address, a participant zip code, or a participant phone number; and
present, on the display of the mobile device and as part of the graphical user interface, at least one second field that accepts at least one of a request name or a total expense amount.

3. The mobile device of claim 1, wherein the processor-executable instructions, when executed by the one or more processors, further cause the one or more processors to present, on the display of the mobile device, as part of the graphical user interface, an actionable object that initiates an expense request interface, the expense request interface having one or more fields that accept the first input for the request data.

4. The mobile device of claim 1, wherein the processor-executable instructions, when executed by the one or more processors, further cause the one or more processors to:
receive, from the expense tracking system, a payment status for each of the one or more participants, the payment status indicating an amount owed for the expense by each of the one or more participants; and present, on the display of the mobile device, as part of the graphical user interface, the amount owed for the expense by each of the one or more participants.

5. The mobile device of claim 1, wherein the processor-executable instructions, when executed by the one or more processors, further cause the one or more processors to determine the respective share of the expense for each of the one or more participants by:
presenting, on the display of the mobile device, as part of the graphical user interface, an actionable object that indicates the expense should be split evenly across the one or more participants; and
determining, responsive to receiving an interaction with the actionable object, the respective share for each of the one or more participants as a total expense amount divided by a number of the one or more participants.

6. The mobile device of claim 1, wherein the processor-executable instructions, when executed by the one or more processors, further cause the one or more processors to determine the respective share of the expense for each of the one or more participants by:
presenting, on the display of the mobile device, as part of the graphical user interface, a field for a respective participant of the one or more participants, the field accepting a value corresponding to the respective share of the expense for the participant; and
determining, based on the value corresponding to the respective share accepted by the field, the respective share of the expense for each of the one or more participants.

7. The mobile device of claim 1, wherein the processor-executable instructions, when executed by the one or more processors, further cause the one or more processors to present, in the graphical user interface, a list of contacts from which the one or more participants can be selected.

8. An expense tracking system, comprising:
one or more processors coupled to memory, the memory storing processor-executable instructions that, when executed by the one or more processors, cause the one or more processors to:
receive, from a mobile device, a first transmission indicative of a request, the first transmission comprising information related to (i) an expense and (ii) one or more participant identifiers;
determine, based on the first transmission or on a second transmission from the mobile device, a respective share of the expense that corresponds to each of the one or more participant identifiers;
generate a payment option corresponding to an account associated with a participant of the one or more participant identifiers based on the respective share of the expense that the participant owes;
send, based on the one or more participant identifiers, a message to one or more participants corresponding to the one or more participant identifiers, the message including a request for payment of the respective share of the expense owed by a respective participant of the one or more participants;
track whether the respective share corresponding to each of the one or more participant identifiers has been paid; and
transmit tracking data to the mobile device to cause the mobile device to:
(i) receive data from the expense tracking system indicative of a payment event; and
(ii) dynamically update, based on the payment event identified in the data from the expense tracking system, a graphical user interface to include one or more indications of whether the respective share corresponding to each of the one or more participant identifiers has been paid.

9. The expense tracking system of claim 8, wherein the processor-executable instructions cause the one or more processors to generate the payment option based on vendor data received from a vendor computing system.

10. The expense tracking system of claim 9, wherein the vendor data is indicative of, for one or more participants, availability of funds for payment of one or more shares of the expense.

11. The expense tracking system of claim 8, wherein the processor-executable instructions further cause the one or more processors to process the expense identified in the first transmission.

12. The expense tracking system of claim 8, wherein the processor-executable instructions further cause the one or more processors to:
receive, from the mobile device, a copy of one or more receipts associated with the expense; and
store the copy of the one or more receipts associated with the expense.

13. The expense tracking system of claim 8, wherein the one or more participant identifiers are one or more e-mail addresses corresponding to the one or more participants, and wherein the processor-executable instructions further cause the one or more processors to send the message by transmitting an e-mail to each of the one or more e-mail addresses corresponding to the one or more participants.

14. The expense tracking system of claim 8, wherein the first transmission is indicative of a selection of a template from a plurality of templates presented in the graphical user interface on a display of the mobile device, and wherein the processor-executable instructions further cause the one or more processors to identify the expense based on the selection of the template.

15. The expense tracking system of claim 8, wherein the message includes an option to show how the respective share of the expense was calculated.

16. The expense tracking system of claim 8, wherein the message includes a hyperlink to an information resource via which the expense tracking system can receive payment information from the participant.

17. A method, comprising:
receiving, by a mobile device comprising one or more processors coupled to memory, via a first input to a graphical user interface presented on a display of the mobile device, request data identifying (i) an expense and (ii) one or more participants;
determining, by the mobile device, based on the first input or a second input provided to the graphical user interface, a respective share of the expense for each of the one or more participants;
transmitting, by the mobile device, to an expense tracking system, the request data and the respective share of the expense for each of the one or more participants, causing the expense tracking system to:
(i) generate a payment option for a participant of the one or more participants based on an account of the participant and based on the respective share of the expense that the participant owes;
(ii) send a message to each of the one or more participants, the message including a request for payment of the respective share of the expense owed by a respective participant of the one or more participants; and (iii) track whether the respective share corresponding to each of the one or more participants has been paid;
receiving, by the mobile device, data from the expense tracking system indicative of a payment event; and
dynamically updating, by the mobile device, based on the payment event identified in the data from the expense tracking system, the graphical user interface to include one or more indications of whether the respective share corresponding to each of the one or more participants has been paid.

18. The method of claim 17, further comprising:
presenting, by the mobile device, on the display of the mobile device as part of the graphical user interface, at least one field that accepts participant information for the one or more participants, the participant information comprising at least one of a participant name, a participant e-mail address, a participant address, a participant zip code, or a participant phone number; and
presenting, by the mobile device, on the display of the mobile device as part of the graphical user interface, at least one second field that accepts at least one of a request name or a total expense amount.

19. The method of claim 17, further comprising:
receiving, by the mobile device, from the expense tracking system, a payment status for each of the one or more participants, the payment status indicating an amount owed for the expense by each of the one or more participants; and
presenting, by the mobile device, on the display of the mobile device, as part of the graphical user interface, the amount owed for the expense by each of the one or more participants.

20. The method of claim 17, wherein determining the respective share of the expense for each of the one or more participants further comprises:
presenting, by the mobile device, on the display of the mobile device, as part of the graphical user interface, an actionable object that indicates the expense should be split evenly across the one or more participants; and
determining, by the mobile device, responsive to receiving an interaction with the actionable object, the respective share for each of the one or more participants as a total expense amount divided by a number of the one or more participants.

\* \* \* \* \*